United States Patent
Clothier et al.

(10) Patent No.: US 8,314,399 B2
(45) Date of Patent: Nov. 20, 2012

(54) RADIATION DETECTOR WITH OPTICAL WAVEGUIDE AND NEUTRON SCINTILLATING MATERIAL

(75) Inventors: Brent Allen Clothier, Clifton Park, NY (US); Adrian Ivan, Niskayuna, NY (US); Chulmin Joo, Niskayuna, NY (US); Daniel Bruno McDevitt, Galway, NY (US)

(73) Assignee: General Electric Company, Niskayuna, NY (US)

( * ) Notice: Subject to any disclaimer, the term of this patent is extended or adjusted under 35 U.S.C. 154(b) by 350 days.

(21) Appl. No.: 12/781,206

(22) Filed: May 17, 2010

(65) Prior Publication Data

US 2010/0276602 A1  Nov. 4, 2010

Related U.S. Application Data

(63) Continuation-in-part of application No. 12/027,828, filed on Feb. 7, 2008, now Pat. No. 7,741,612.

(51) Int. Cl.
 *G01T 3/00* (2006.01)
(52) U.S. Cl. .................................. 250/390.01
(58) Field of Classification Search . 250/390.01–390.12
See application file for complete search history.

(56) References Cited

U.S. PATENT DOCUMENTS

| | | | |
|---|---|---|---|
| 2,920,204 A | 1/1960 | Youmans | |
| 3,566,118 A | 2/1971 | Peters | |
| 5,481,114 A | 1/1996 | Daniel et al. | |
| 6,707,047 B2 | 3/2004 | Craig et al. | |
| 7,238,951 B2 | 7/2007 | Disdier et al. | |
| 2004/0051048 A1* | 3/2004 | Murray et al. | 250/390.11 |
| 2005/0023479 A1 | 2/2005 | Grodzins | |
| 2005/0224719 A1* | 10/2005 | Polichar et al. | 250/390.01 |
| 2007/0029493 A1 | 2/2007 | Kniss et al. | |

FOREIGN PATENT DOCUMENTS

WO  2007/070859  6/2007

OTHER PUBLICATIONS

Knoll et al., "Light collection in scintillation detector composites for neutron detection," 1988, IEEE Transactions on Nuclear Science, vol. 35, No. 1 pp. 872-875.*
Shestakova, Irina, et al., "A High Spatial Resolution Sensor for Thermal Neutron Imaging," IEEE Transactions on Nuclear Science, vol. 54, No. 5, pp. 1797-1800, Oct. 2007.

* cited by examiner

*Primary Examiner* — Kiho Kim
(74) *Attorney, Agent, or Firm* — Jason K. Klindtworth (57) ABSTRACT

A radiation detector includes a neutron sensing element comprising a neutron scintillating composite material that emits a first photon having a first wavelength and an optical waveguide material having a wavelength-shifting dopant dispersed therein that absorbs the first photon emitted by the neutron scintillating composite material and emits a second photon having a second, different wavelength, and a functionalized reflective layer at an interface between the neutron scintillating composite material and the optical waveguide material. The functionalized reflective layer allows the first photon emitted by the neutron scintillating composite material to pass through and into the optical waveguide material, but prevents the second photon emitted by the optical waveguide material from passing through and into the neutron scintillating composite material. The photons emitted from the neutron sensing element are collected and channeled through the optical waveguide material and into a photosensing element optically coupled to the neutron sensing element.

11 Claims, 10 Drawing Sheets

RADIATION DETECTOR WITH OPTICAL WAVEGUIDE AND NEUTRON SCINTILLATING MATERIAL

CROSS-NOTING TO RELATED APPLICATION

This application is a continuation-in-part of application Ser. No. 12/027,828, filed Feb. 7, 2008, the entire contents of which are incorporated herein by reference.

This application is related to application Ser. No. 12/781,182, filed May 17, 2010, entitled "INTEGRATED NEUTRON-GAMMA RADIATION DETECTOR WITH OPTICAL WAVEGUIDE AND NEUTRON SCINTILLATING MATERIAL," now U.S. Pat. No. 7,915,596, the entire contents of which are incorporated herein by reference.

BACKGROUND OF THE INVENTION

1. Field of the Invention

The teachings herein relate to a detector of ionizing radiation and more particularly to a detector for detecting a gamma component and a neutron component.

2. Description of the Related Art

Detection of radioactive materials, particularly those illicitly hidden in the stream of commerce, requires the availability of a variety of radiation detection equipment. In particular, Hand-Held RadioIsotope Identification Devices (HHRIID) are needed in the field to quickly determine the presence of special nuclear material and distinguish it from the presence of medical and industrial radioisotopes, as well as from normally occurring radioactive material. One possible embodiment of an HHRIID consists of two optically separated radiation sensors that emit light and are coupled to a common photodetector. The first radiation sensor is a neutron sensing component that contains atomic nuclei with a high neutron cross section, such as $^6$Li in a chemical compound, such as $^6$LiF, surrounded by particles of a scintillator material, for example, ZnS:Ag, and bound together in an epoxy matrix. The second radiation sensor is a gamma sensing component and consists of a scintillator crystal with enhanced gamma energy resolution, high gamma stopping power, and an atomic composition with very low neutron absorption cross section. The two radiation sensors are optically separated in such a manner that the light emitted by one sensor does not reach the other sensor in order to avoid optical crosstalk. The HHRIID may include a pulse shape discrimination circuit that identifies the source of light emitted (either by the neutron sensing component or the gamma sensing component based on the difference in scintillation light decay times.)

In the detection of neutrons via solid-state scintillation, perhaps the most highly-utilized material stems from a granular mixture of $^6$LiF and ZnS:Ag. Each component in this mixture represents "best-of-class" performance (i.e., respectively, neutron capture and luminescence). For neutron capture, the LiF crystal structure offers one of the highest Li atom densities in solid-state form and maximizes the probability of neutron interaction, especially if in addition it is enriched in $^6$Li. Furthermore, the absorption of thermal neutrons by $^6$Li induces direct disintegration into alpha and triton particles with no other secondary radiation. The absence of multiple reaction pathways and/or radiation by-products enables one to optimize the corresponding phosphor to a single secondary radiation type (i.e., heavy charged particles). For luminescence, ZnS:Ag is one of the brightest phosphors known and remains unparalleled in its emission under alpha and triton exposure.

A crucial metric in determining the performance of a neutron scintillator is neutron sensitivity, the number of neutron events registered per incoming neutron flux. This measurement requires the collection and counting of photons from the neutron scintillator. However, the light output of $^6$LiF/ZnS:Ag materials is limited by two factors: [1] self-absorption of the emitted light by the ZnS:Ag phosphor, and [2] optical attenuation of the emission photons via scattering. The latter arises due to the granular nature of the material (i.e., the multitude of interfaces with index-of-refraction mismatches). The end result is a threshold in thickness beyond which further (useful) light output is unachievable.

Conventional neutron detection approaches typically rely on the optical coupling of a thin disk of $^6$LiF/ZnS:Ag composite material (<1 mm) to the flat, circular face of a photosensor. For reasons stated above, the neutron sensitivity of this design cannot be improved by increasing the thickness of the disk. Instead, multiple layers of $^6$LiF/ZnS:Ag composite material must be employed, which in turn, create substantial difficulties in transporting the resulting additional light to the photosensor(s). Furthermore, a flat disk may not be the desired shape for neutron capture. If an application requires the moderation of neutron energies (i.e., reduction to ambient, thermal energies), cylindrical shells are preferable to disks. For this geometry, the challenge of light transport becomes even more acute.

In order to improve the total neutron sensitivity of the detector while providing a design that reduces both the size and weight of the detector, an optimal integrated gamma/neutron detector must address the issue of packaging a larger area of neutron sensing composite material.

In addition, neutron scintillating composite (NSC) materials, when comprised of granular mixtures (e.g., $^6$LiF/ZnS:Ag, $^{10}$B$_2$O$_3$/ZnS:Ag, etc.), suffer from optical losses due to the internal scattering and absorption of light. The commercial utility of these mixtures, however, remains high due to their exceptionally low cost. In addition, ZnS:Ag is known to self-absorb a fraction of its own emission. Despite this loss mechanism, ZnS:Ag remains a useful phosphor because its energy conversion is the highest known for alpha and triton particles. ZnS:Ag is also inexpensive, having been produced commercially for decades as a standard blue phosphor for CRTs.

These two loss mechanisms, separately or combined, produce a thickness limitation: increasing the NSC thickness beyond a certain threshold value—1.0 mm for $^6$LiF/ZnS:Ag mixtures—provides no additional light output despite the additional capability for neutron absorption.

BRIEF SUMMARY OF THE INVENTION

The problem of minimizing self-absorption of scintillation emissions from neutron scintillating materials has been solved by placing a functionalized reflective layer between the neutron scintillating composite (NSC) material and the optical waveguide material and by incorporating a wavelength-shifting dopant in the optical waveguide material. The functionalized reflective layer transmits emissions (photons) from the NSC material (i.e., $\lambda_1$), but reflects photons emitted by the wavelength-shifting dopants (i.e., $\lambda_2$). Thus, the wavelength-shifting process (i.e., $\lambda_1 \rightarrow \lambda_2$) entraps light within the optical waveguide material, preventing its re-entry back into the NSC material. Successive reflections then collect and channel the wavelength-shifted photons down the optical waveguide material towards its ends. One or both ends of the optical waveguide material are optically-coupled to a photosensing element, which in turn, counts the incoming photons.

In one embodiment, a radiation detector comprises a neutron sensing element comprising a neutron scintillating composite material that emits a first photon having a first wavelength in response to a neutron capture event, and an optical waveguide material at least partially surrounding the neutron scintillating composite material. The optical waveguide material has a wavelength-shifting dopant dispersed therein that absorbs the first photon emitted by the neutron scintillating composite material and emits a second photon having a second, different wavelength. The neutron sensing element also includes a functionalized reflective layer at an interface between the neutron scintillating composite material and the optical waveguide material. The functionalized reflective layer allows the first photon emitted by the neutron scintillating composite material to pass through the functionalized reflective layer and into the optical waveguide material, and prevents the second photon emitted by the optical waveguide material from passing through the functionalized reflective layer and into the neutron scintillating composite material. The photons emitted from the neutron sensing element are collected and channeled through the optical waveguide material and into a photosensing element optically coupled to the neutron sensing element.

In another aspect, a method of detecting radiation comprises:

disposing a neutron scintillating composite material within an optical waveguide material to form a neutron sensing element, the neutron scintillating composite material emitting a first photon having a first wavelength in response to a neutron capture event;

dispersing a wavelength-shifting dopant within the optical waveguide material, the wavelength-shifting dopant absorbing the first photon emitted by the neutron scintillating composite material and emitting a second photon having a second wavelength, the second wavelength different than the first wavelength; and disposing a functionalize reflective layer between the neutron scintillating composite material and the optical waveguide material, whereby the functionalized reflective layer allows the first photon emitted by the neutron scintillating composite material to pass through the functionalized reflective layer and into the optical waveguide material, and prevents the second photon emitted by the optical waveguide material from passing through the functionalized reflective layer and into the neutron scintillating composite material, and whereby photons emitted from the neutron sensing element are collected and channeled through the optical waveguide material and into a photosensing element optically coupled to the neutron sensing element.

DETAILED DESCRIPTION OF THE INVENTION

Figure 1:
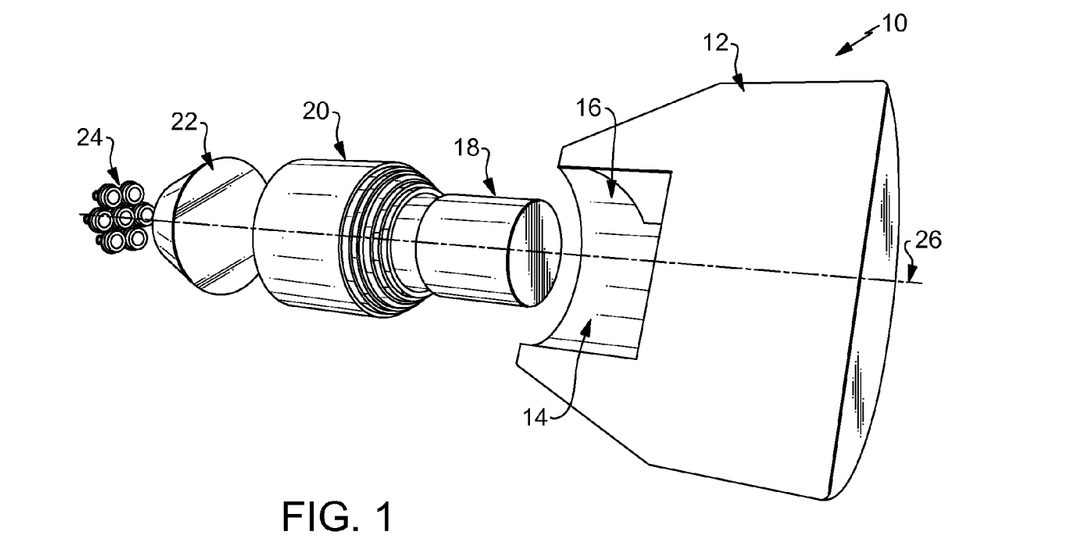
FIG. 1 is an exploded view of an integrated neutron/gamma detector including a neutron sensing element with an optical waveguide and neutron scintillating material according to an embodiment of the invention.
Figure 2:
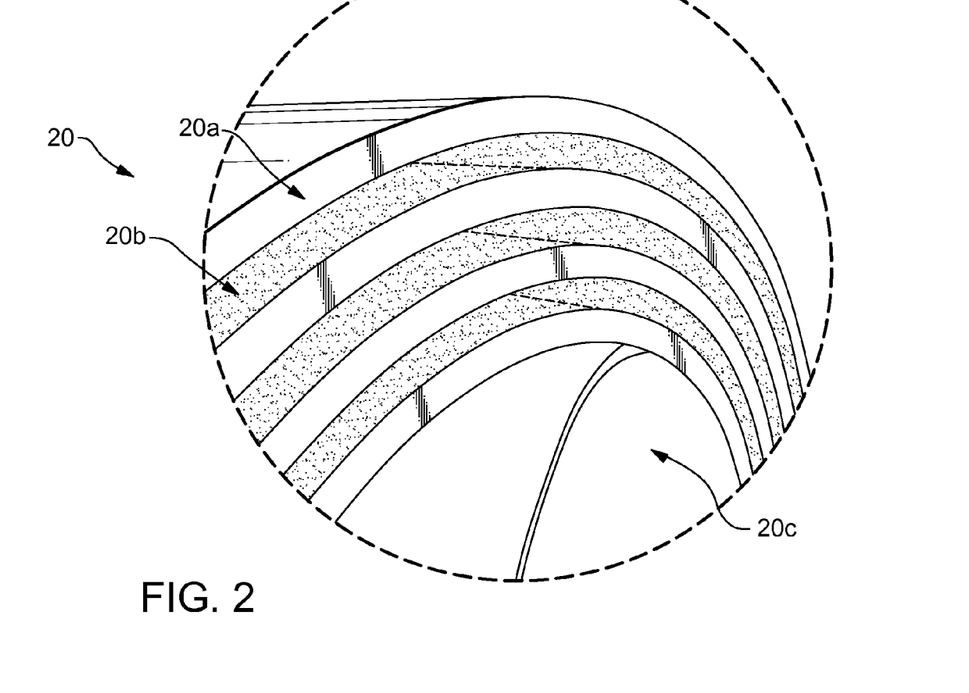
FIG. 2 is an exploded view of the neutron sensing element of the neutron/gamma detector of FIG. 1 according to an embodiment of the invention.
Figure 3:
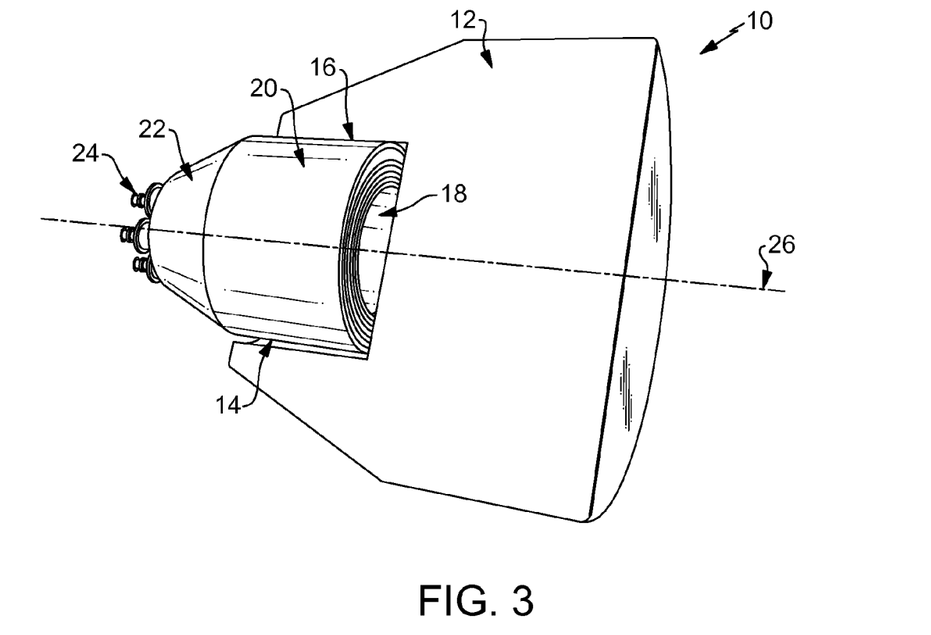
FIG. 3 is a perspective view of the integrated neutron/gamma detector of FIG. 1 when assembled.

Referring now to FIGS. 1-3, an integrated neutron-gamma radiation detector is shown generally at 10 according to an embodiment of the invention. At one end, the detector 10 includes a neutron moderator 12 that includes a material that slows down fast neutrons entering the moderator 12, but allowing thermal neutrons and gamma rays to easily pass therethrough. For example, the neutron moderator 12 may include hydrogen, and the like. The moderator 12 includes a cavity 14 that can be lined with an optical reflector material 16. A gamma sensing element 18 is disposed within the cavity 14 of the neutron moderator 12 and surrounded by another layer of the optical reflector 16 to increase the optical efficiency of the detector 10. In one embodiment, the gamma sensing element 18 comprises a scintillator crystal that emits a light pulse having a decay time, τ, when a gamma ray collides with the gamma sensing element 18. Typical materials for the scintillator crystal include, without limitation, crystalline materials with high energy resolution (3% or better at 662 keV) from the Lanthanum halides class (LaBr$_3$, LaCl$_3$, LaI$_3$), as well as solid solutions of these materials. Other dense, bright and fast scintillator materials are useful for incorporation into the gamma sensor 18 as well. For example, the scintillator crystal may be made of a mixed lanthanum halide LaX$_3$:Ce (X=Cl, Br, I) gamma scintillator material that emits a light pulse having a decay time, τ$_1$, of about 20 nanoseconds. The mixed lanthanum halides LaX$_3$:

Ce (X=Cl, Br, I) gamma scintillator material has outstanding energy resolution that will consequently enable high-performance room temperature detectors at considerably lower cost when compared to current technologies, such as cryogenically cooled high purity Germanium (HP Ge).

The detector 10 includes a neutron sensing element 20 that is disposed within the cavity 14 of the neutron moderator 12. In the illustrated embodiment, the neutron sensing element 20 is disposed proximate the gamma sensing element 18 such that at least a portion of the gamma sensing element 18 is disposed within the neutron sensing element 20 for a spatially-compact design, as shown in FIG. 3. The optical reflector material 16 is used in layers that surround both the neutron sensing element 20 and the gamma sensing element 18 to provide an optically efficient design.

The detector 10 also includes a photosensing element or array of photosensing elements 24, such as a photodiode or photomultiplier tube (PMT), and the like, which is optically coupled to the gamma sensing element 18 and the neutron sensing element 20. In the illustrated embodiment, a light collector 22 is disposed between the photosensing element 24 and the gamma sensing element 18 and the neutron sensing element 20. The collector 22 is made of an optically transparent material, such as epoxy, plastic, glass, and the like. The purpose of the collector 22 is to act as a lens and funnel the photons emitted from the gamma sensing element 18 and neutron sensing element 20, which have a relatively large diameter, into the photosensing element 24, which typically has a relatively smaller diameter, and increase the optical efficiency of the detector 10. The collector 22 may be surrounded by an optical reflector (not shown), if necessary, to further increase the optical efficiency of the detector 10. It will be appreciated that the collector 22 can be eliminated when the relative diameters of the gamma and neutron sensing elements 18, 20 are approximately equal to the diameter of the photosensing element 24.

It will be appreciated that the invention can be practiced with any suitable photosensor acting as the photosensing element, and that the use herein of the photodiode or PMT as a photosensor is merely illustrative and non-limiting. The photosensing element 24 outputs a signal, S, indicative by its decay time characteristic of the two different types of photons emitted by the gamma sensing element 18 and the neutron sensing element 20. Thus, detector 10 needs only a single photosensing element 24 to detect the two different types of light pulses emitted by the gamma and neutron sensing elements 18, 20.

Although in the illustrated embodiment the integrated detector 10 includes an array of photodiodes as the photosensing element 24, the detector 10 may comprise other photosensitive devices. For example, other embodiments of the detector 10 may include a photomultiplier tube, a PIN photodiode, an avalanche photodiode, a Geiger-mode operating photodiode, a hybrid photodetector and other similar devices, operating either individually or grouped as an array. In short, the photosensing element 24 is designed to receive and interpret a signal from each of the gamma sensing element 18 and the neutron sensor element 20 (each of the gamma sensing element 18 and the neutron sensing element 20 being a scintillator and providing and optical output in response to a radiation interaction). To interpret such signals, the detector 10 may also include a pulse shaping and processing electronics package (not shown) of a type well-known in the art that processes the signal, S, from the photosensing element 24 to determine whether a given photon-emitting event is indicative of radiation interaction in the gamma sensing element 18 or in the neutron sensor element 20. In the case of gamma rays, the electronics also determine the energy of the gamma ray based on the amount of charge generated in the photosensing element 24 and a calibration procedure with known gamma ray energies from radioisotopic sources. For example, the pulse shape and process electronics package may include an analog-to-digital converter (ADC) and also a charge [Q] to digital converter (QDC) (not shown) that receive the signal, S, from the photosensing element 24. Each signal, S, is indicative of a radiation interaction in one of the gamma sensing element 18 and the neutron sensing element 20, and has a signal amplitude $V_0$.

Referring now to FIG. 2, one aspect of the invention is that the neutron sensing element 20 comprises an optical waveguide material 20a surrounding a neutron scintillating material 20b, and a central aperture 20c of sufficient dimension such that at least a portion of the gamma sensing element 18 is capable of being disposed therein. In an embodiment, the optical waveguide material 20a may be made of, for example, fused/glassy silica, transparent plastic, and the like. For example, the optical waveguide material 20a may comprise an optical waveguide of a type well-known in the art. The neutron scintillating material 20b may comprise, for example, a mixture of particles of a neutron capture material, for example, $^6$Li in a chemical compound form, such as $^6$LiF, and a scintillator material, such as ZnS:Ag, both in an optically transparent epoxy matrix.

The neutron scintillator material has a relatively large cross section (940 barns per Li $^6$atom) for thermal neutrons. Upon absorption of a thermal neutron, $^6$Li decays into $^3$H and emits an alpha particle, both charged particles with a total kinetic energy of about 4.8 MeV. The alpha particle and the triton are absorbed by the scintillator material, such as ZnS:Ag, which emits a 450 nm photon having a decay time, $\tau_2$, of about 110 nanoseconds, which is different than the decay time, $\tau_1$, of the photons emitted from the scintillator crystal of the gamma sensing element 18. An optimum radius or thickness is utilized to maximize the photon flux exiting the surface area of the neutron scintillating material 20b. For example, the radius of a very thin shell of $^6$LiF/ZnS:Ag composite material would be selected to maximize internal light generation, and the thickness of the cylindrical shell would be chosen to optimize emissions from the exterior and interior surfaces.

It will be appreciated that the invention is not limited to using $^6$LiF/ZnS:Ag as the neutron scintillating material, and that other neutron scintillating materials can be disposed within the optical waveguide. These materials may include compositions in which both the neutron capture and luminescence functions are embodied within a single composition (i.e., not two as in the case of $^6$LiF and ZnS:Ag). For example, liquid or plastic neutron scintillating materials containing $^6$Li, $^{10}$B, $^{157}$Gd, and the like, are suitable candidates as neutron scintillating materials.

As described above, interaction of the alpha particle and triton with the scintillator material, such as ZnS:Ag, provides for photon emission from the neutron scintillating material 20b. Accordingly, although other phenomena may be included or potentially influence signals generated by the $^6$LiF/ZnS:Ag component, it should be recognized that the use of "neutron sensor" accounts for the various aspects and mechanisms that provide for or are attendant with neutron detection, and therefore the term "neutron sensor" is not to be limited by the various aspects and mechanisms.

In the illustrated embodiment, the neutron sensing element 20 comprises a plurality of concentric cylindrical rings or shells of alternating optical waveguide and neutron scintillating material. The rings or shells of material are extended along and are substantially aligned with a longitudinal axis 26 of the detector 10. However, it will be appreciated that the invention is not limited to a particular configuration for the neutron sensing element 20 and that many possible configurations for the neutron sensing element 20 are within the scope of the invention. In one example, the neutron sensing element 20 has an innermost shell of optical waveguide material 20a followed by alternating shells of neutron scintillating material 20b and waveguide material 20a, and an outermost shell of waveguide material 20a. In another example, the neutron sensing element 20 has an innermost solid "core" of either optical waveguide material 20a or neutron scintillating material 20b followed by alternating shells of optical waveguide material 20a and waveguide material 20b, and an outermost shell of waveguide material 20a (i.e., without the central aperture of 20c); in this latter case, it is not required that the gamma sensing element 18 be disposed within the central aperture 20c of the neutron sensing element 20.

It will also be appreciated that the invention is not limited by the number and thickness of the alternating shells of waveguide material and neutron scintillating material, and that the number and thickness of the shells can be varied as needed. For example, the neutron sensing element 20 may comprise of only three shells of material, e.g., a shell of neutron scintillating material 20b disposed between an innermost and an outermost shell of optical waveguide material 20a. It will also be appreciated that the invention is not limited by the use of alternating layers, and that the invention can be practiced with non-alternating layers of optical waveguide material and neutron scintillating material.

Because the optical waveguide 20a surrounds the neutron scintillation material 20b, the photon emitted by the neutron sensing material 20b is collected and channeled to the end of the optical waveguide material 20a. The photosensing element 24, which is optically coupled to the neutron sensing element 20, then detects the photon as a neutron event. To enhance internal reflection of the photon, the optical waveguide material 20a should have (ideally) a refractive index greater than that of the neutron scintillating material 20b. If needed, the surfaces of the optical waveguide material 20a may be coated with a thin reflective layer (not shown) to induce a "one-way mirror" effect to improve internal reflection. Ideally, the optical waveguide material 20a should also have a very high transmission (>90%) at the wavelength of the neutron scintillating material 20b. It is appreciated that the thickness of the optical waveguide material 20a and the thickness and diameter of the core of neutron scintillating material 20b can be optimized to maximize the amount of photons collected by the waveguide material 20a and ultimately interpreted as an event.

Figure 4:
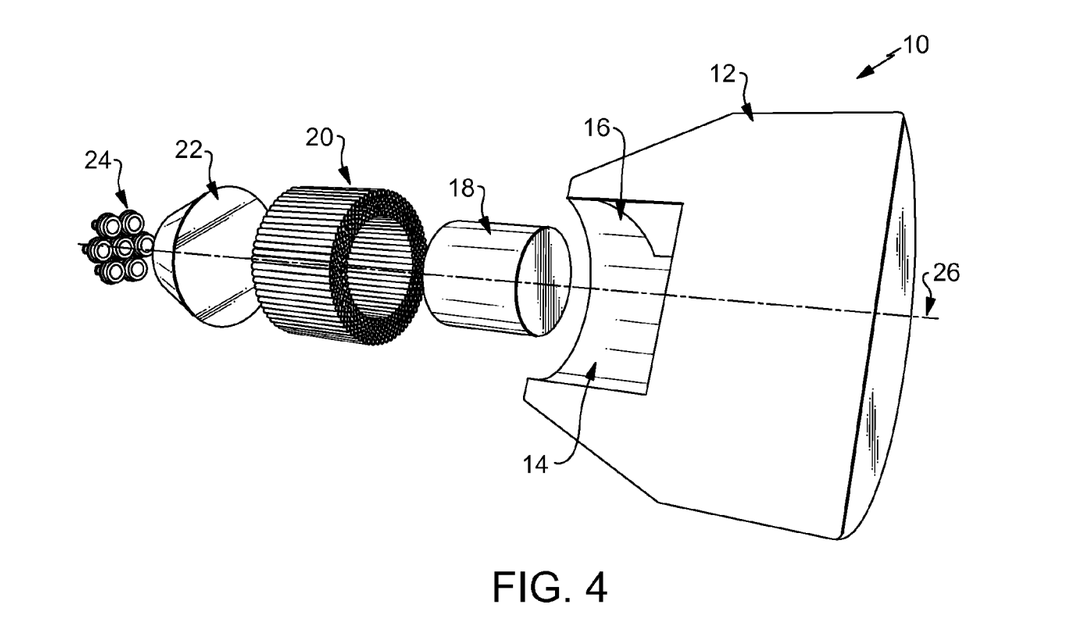
FIG. 4 is an exploded view of an integrated neutron/gamma detector including a neutron sensing element with an optical waveguide and neutron scintillating material according to another embodiment of the invention.
Figure 5:
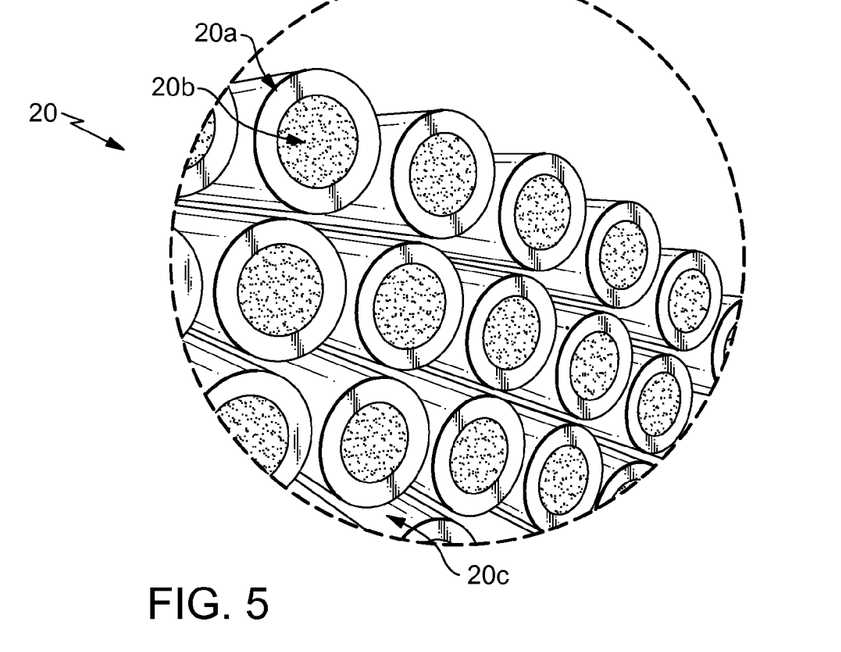
FIG. 5 is an exploded view of the neutron sensing element of the neutron/gamma detector of FIG. 4 according to another embodiment of the invention.
Figure 6:
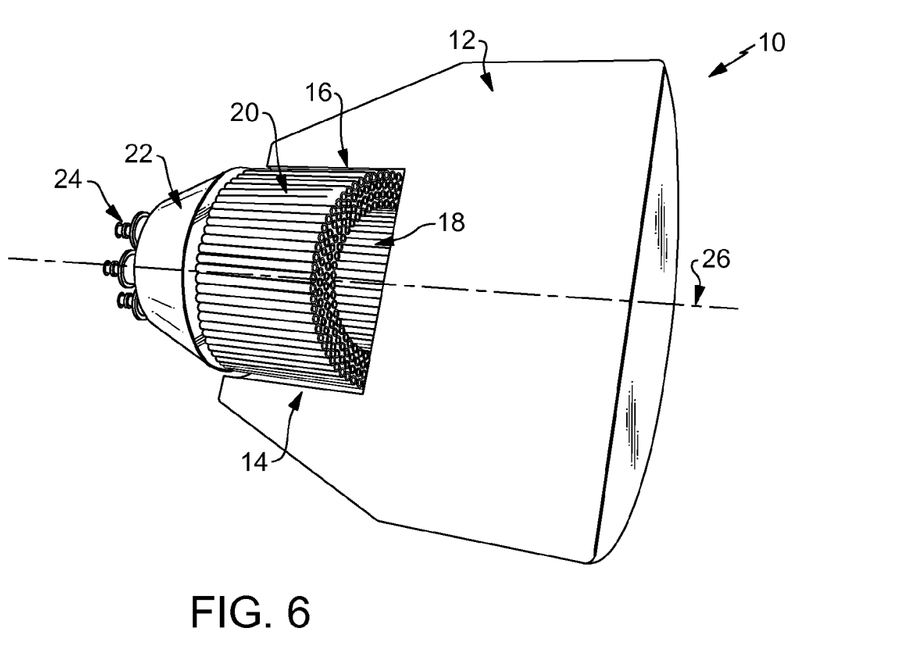
FIG. 6 is a perspective view of the integrated neutron/gamma detector of FIG. 4 when assembled.

Referring now to FIGS. 4-6, another configuration of the neutron sensing element 20 of the detector 10 is shown. In this embodiment, the neutron sensing element 20 comprises a plurality of "strands" of the neutron scintillating material 20b disposed within the interior of an annular or tubular optical waveguide material 20a. The "strands" extend along and are substantially aligned with the longitudinal axis 26 of the detector 10 to form a multi-layered structure having the central aperture 20c such that at least a portion of the gamma sensing element 18 can be disposed therein, similar to the cylindrical shell of the neutron sensing element 20 shown in FIGS. 1-3. The "strands" may also form the neutron sensing element 20 with a solid core (without the central aperture 20c) in the case where it is not required that the gamma sensing element 18 be disposed within the central aperture 20c of the neutron sensing element 20.

It will be appreciated that the invention is not limited by the number of layers of "strands" to form the neutron sensing element 20, and that the invention can be practiced with an optimal number of layers for photon collection and transmission to the photosensing element 24.

Figure 7:
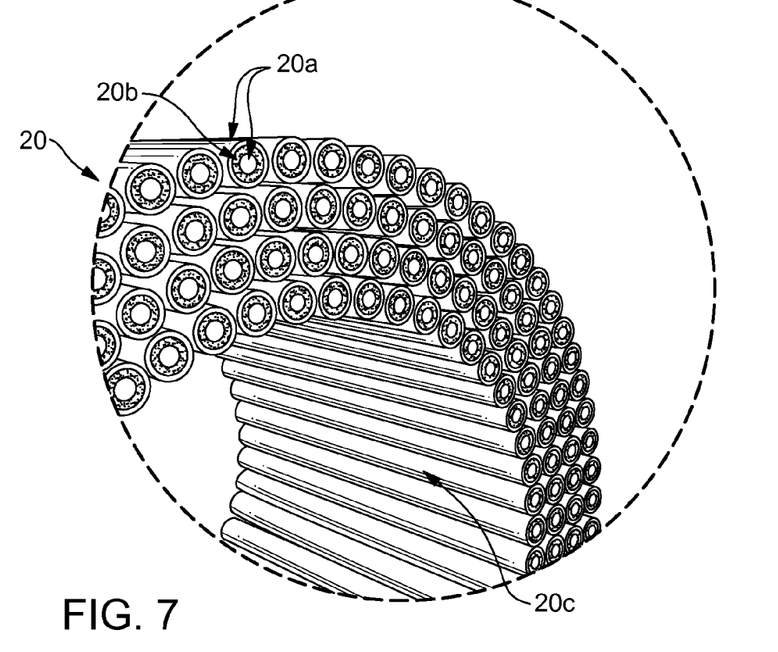
FIG. 7 is a cross-sectional view of strands of the neutron sensing element according to an alternate embodiment of the invention.
Figure 8:
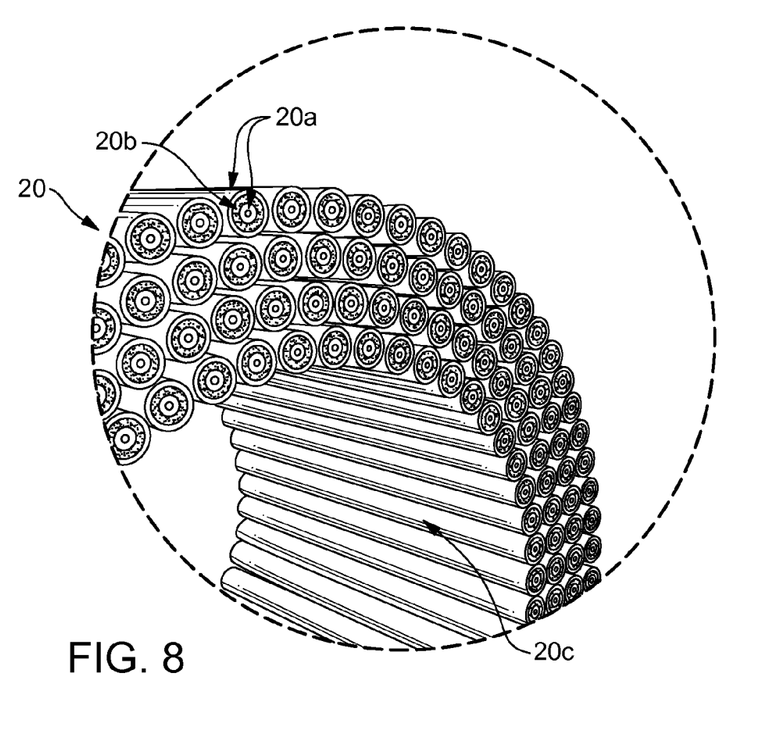
FIG. 8 is a cross-sectional view of strands of the neutron sensing element according to another alternate embodiment of the invention.

In the embodiment shown in FIG. 5, each "strand" of the neutron sensing element 20 comprises a cylindrical tube of optical waveguide material 20a and a solid "core" of neutron scintillating material 20b disposed within the cylindrical tube of optical waveguide material 20a. However, it should be understood that the invention is not limited to the configuration for each "strand" of the neutron sensing element 20 and that many configurations are within the scope of the invention. For example, the "strands" of neutron sensing element 20 can comprise an outer, cylindrical shell of optical waveguide material 20a and an innermost concentric solid "core" of optical waveguide material 20a wherein a neutron scintillating material 20b is disposed between the shell and "core", as shown in FIG. 7. In an alternate embodiment, the "strands" of neutron sensing element 20 can comprise two concentric, cylindrical shells of optical waveguide material 20a and a neutron scintillating material 20b disposed between the two shells, as shown in FIG. 8.

As described above, the integrated neutron-gamma radiation detector 10 addresses the thickness limitation by teaching parallel alternating layers of neutron scintillating composite material (NSC) and optical waveguide material. The thicknesses of the NSC layers are optimized to maximize light output while the interspersed waveguide layers channel light out their ends. The NSC layer is not restricted to granular mixtures and can be comprised of any neutron absorbing and scintillating material (single- or multi-component) that exhibits one or both of the aforementioned loss mechanisms.

The detector 10 has a cylindrical symmetry that enables a macroscopic scintillating body of nested, concentric shells—or using a simpler cross-section—a strand. The cross-section of the strand is comprised of either an NSC core with an cladding of optical waveguide or an NSC layer sandwiched between a core and cladding of optical waveguide. The strand can be "bundled" together to form a macroscopic scintillating body.

By interspersing optical waveguide layers in between NSC layers, the detector 10 enables a hybrid body capable of large neutron absorption volumes. Therefore, the optical waveguide layers "extract" photons (light) that would otherwise be absorbed in an NSC-only body. The modest increase in volume (i.e., by the optical waveguide layers) is offset by dramatically improved neutron detection efficiency (i.e., via greater light detection at the photosensor).

However, it has been discovered that the index of refraction mismatch of the neutron scintillating material 20b (i.e., neutron scintillating composite material (NSC)) and the optical waveguide material 20a alone may be insufficient to enable the high reflection needed for efficient optical transmission. Specifically, neutron scintillating composite materials (NSCs), when comprised of granular mixtures (e.g., $^6$LiF/ZnS:Ag, $^{10}$B$_2$O$_3$/ZnS:Ag, etc.), suffer from optical losses due to the internal scattering and absorption of light. The commercial utility of these mixtures, however, remains high due to their exceptionally low cost. In addition, ZnS:Ag is known to self-absorb a fraction of its own emission. Despite this loss mechanism, ZnS:Ag remains a useful phosphor because its energy conversion is the highest known for alpha and triton particles. ZnS:Ag is also inexpensive, having been produced commercially for decades as a standard blue phosphor for CRTs. However, these two loss mechanisms, separately or combined, produce a thickness limitation: increasing the NSC thickness beyond a certain threshold value—1.0 mm for $^6$LiF/ZnS:Ag mixtures—provides no additional light output despite the additional capability for neutron absorption. Therefore, there is a need for a radiation detector that is designed to improve the optical transmission of waveguide layers that share a physical interface with neutron scintillating composite material (NSC) layers.

Referring now to FIGS. 9-15, a radiation detector is shown at 100 according to another embodiment of the invention. In general, this embodiment improves optical transmission by: [1] placing a functionalized reflective layer in between all such interfaces and [2] incorporating wavelength-shifting dopants in the waveguide layer. The functionalized reflective layer transmits emissions from the NSC (i.e., $\lambda_1$) but reflects photons emitted by the wavelength-shifting dopants (i.e., $\lambda_2$). Thus, the wavelength-shifting process (i.e., $\lambda_1 \rightarrow \lambda_2$) entraps light within the waveguide, preventing its re-entry back into the NSC layer. Successive reflections then channel wavelength-shifted light down the waveguide towards its ends. The waveguide ends are optically coupled to a photosensor, which in turn, counts the incoming photons. A simple mirror layer covers any terminal surface (i.e., no interface between the NSC and optical waveguide layers). Without such features, scintillator emissions are at risk to re-enter the NSC layer, becoming permanently absorbed.

Figure 9:
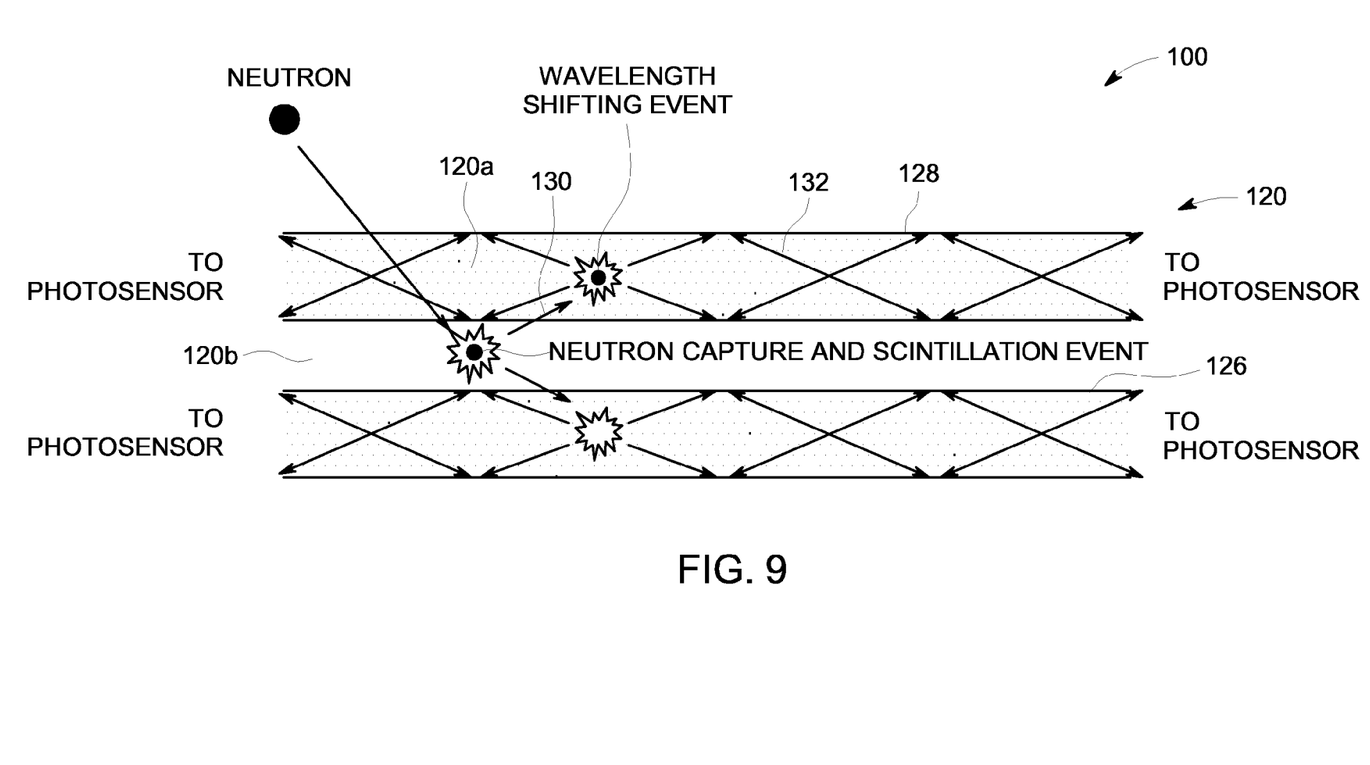
FIG. 9 is a cross-sectional schematic view of a single layer of a neutron sensing element of a radiation detector according to another embodiment of the invention.

Referring now to FIG. 9, the radiation detector 100 is shown according to an embodiment of the invention. The radiation detector 100 includes a neutron sensing element 120 comprising an optical waveguide material 120a and a neutron scintillating composite material (NSC) 120b. The optical waveguide material 120a may be made of, for example, fused/glassy silica, transparent plastic, and the like, with a wavelength-shifting dopant. The NSC material 120b may be made of a granular mixture of one or more components that is held together by an optically transparent epoxy. For example, the NSC material 120b may be made of a $^6$LiF/ZnS:Ag granular mixture incorporating an Epotek 301-2 epoxy matrix, a $^{10}$B$_2$O$_3$/ZnS:Ag granular mixture incorporating an Epotek 301-2 epoxy matrix, [21], and the like. In another example, the NSC material 120b may be made of a material in which both the neutron capture and luminescence functions are embodied within a single composition (e.g., $^6$Li, $^{10}$B, $^{157}$Gd plastic or liquid scintillators). It has been found that $^6$LiF provides neutron capture functionality, while ZnS:Ag provides luminescent functionality.

The detector 100 also includes a functionalized reflective layer 126 disposed at an interface between the NSC material 120b and the optical waveguide material 120a for transmitting a photon 130 emitted by the NSC material 120b at selected wavelengths through the functionalized reflective layer 126, but reflects photons at other wavelengths. The detector 100 also includes an outer reflective layer 128, for example, a simple mirror coating of aluminum, and the like, for preventing wavelength shifted photons 132 emitted by the optical waveguide material 120a from escaping through the outer surface of the neutron sensing element 120. Similar to the detector 10, the neutron sensing element 120 is optically coupled to the photosensing element 24 (not shown in FIG. 9).

The generic operating principles of the radiation detection 100 of the invention will now be described. First, the neutron scintillating composite material (NSC) 120b absorbs neutrons via its neutron-capture isotope, examples of which include $^6$Li, $^{10}$B, $^{157}$Gd, and the like. Preference is given to $^6$Li due to its simple reaction by-products (i.e., one alpha and triton particle) and their high energy (i.e., 4.78 MeV for thermal neutron absorption). Physical embodiments of $^6$Li include $^6$LiF, $^6$LiOH, $^6$Li glasses, $^6$Li plastics, or $^6$Li containing liquids.

Second, the neutron-capture by-products activate a phosphor or scintillating material in the NSC material 120b. Such luminescent material has a conversion efficiency optimized for the neutron-capture isotope and its by-products. In the $^6$Li physical embodiment, preference is given to ZnS:Ag which has the brightest emission known for energetic alpha and triton particles.

Third, a photon 130 (i.e. light emission) from the NSC material 120b exits its surface, passes through the functionalized reflective layer 126, and enters the optical waveguide material 120a. The functionalized reflective layer 126 has been engineered to transmit specific photon wavelengths, but reflect other photon wavelengths. Examples of functionalized reflective layers are known to those skilled in the art, and include optical bandpass filters, dichroic coatings, resonant grating structures, photonic lattice or bandgap structures, and the like. In the 6-LiF/ZnS:Ag physical embodiment, 450-nm photons are transmitted (i.e., the emission of ZnS:Ag).

Fourth, the optical waveguide material 120a contains wavelength-shifting dopants (e.g., fluorophores, quantum dots) that absorb the photons 130 emitted by the NSC material 120b, and re-emit these emissions with photons 132 having different wavelengths (i.e. wavelength-shifted photons 132) than the photons 130 emitted by the NSC material 120b. Wavelength-shifting dopants with high conversion efficiencies are known to those skilled in the art. For example, 9,10-Bis(Phenylethynyl)Anthracene can shift ~450-nm light to ~500 nm with >80% quantum efficiency.

Fifth, the wavelength-shifted photons 132 are trapped within the optical waveguide material 120a by the functionalized reflective layer 126. The functionalized reflective layer 126, which previously transmitted the photons 130 emitted by the NSC material 120b, now reflects the wavelength-shifted photons 132, preventing their entry back into the NSC material 120b. This reflection helps channel the wavelength-shifted photons 132 towards the ends of the optical waveguide material 120a. The wavelength-shifted photons 132 exit the one or both ends of the optical waveguide material 120a and is counted by the photosensing element 24 as a neutron scintillating event.

Sixth, a simple mirrored coating 128 (e.g., aluminum) on the exterior/terminal surface(s) of the neutron sensing element 120 prevents the wavelength-shifted photons 132 from exiting the neutron sensing element 120.

The improvement of this invention is embodied by the simultaneous inclusion of the functionalized reflective layer 126 and the wavelength-shifting dopants in the optical waveguide material 120a. The ability of the functionalized reflective layer 126 to transmit specific wavelengths, while reflecting others, enables the functionalized reflective layer 126 to serve as a "one-way mirror" when used in conjunction with appropriate wavelength-shifting dopants in the optical waveguide material 120a.

Figure 10:
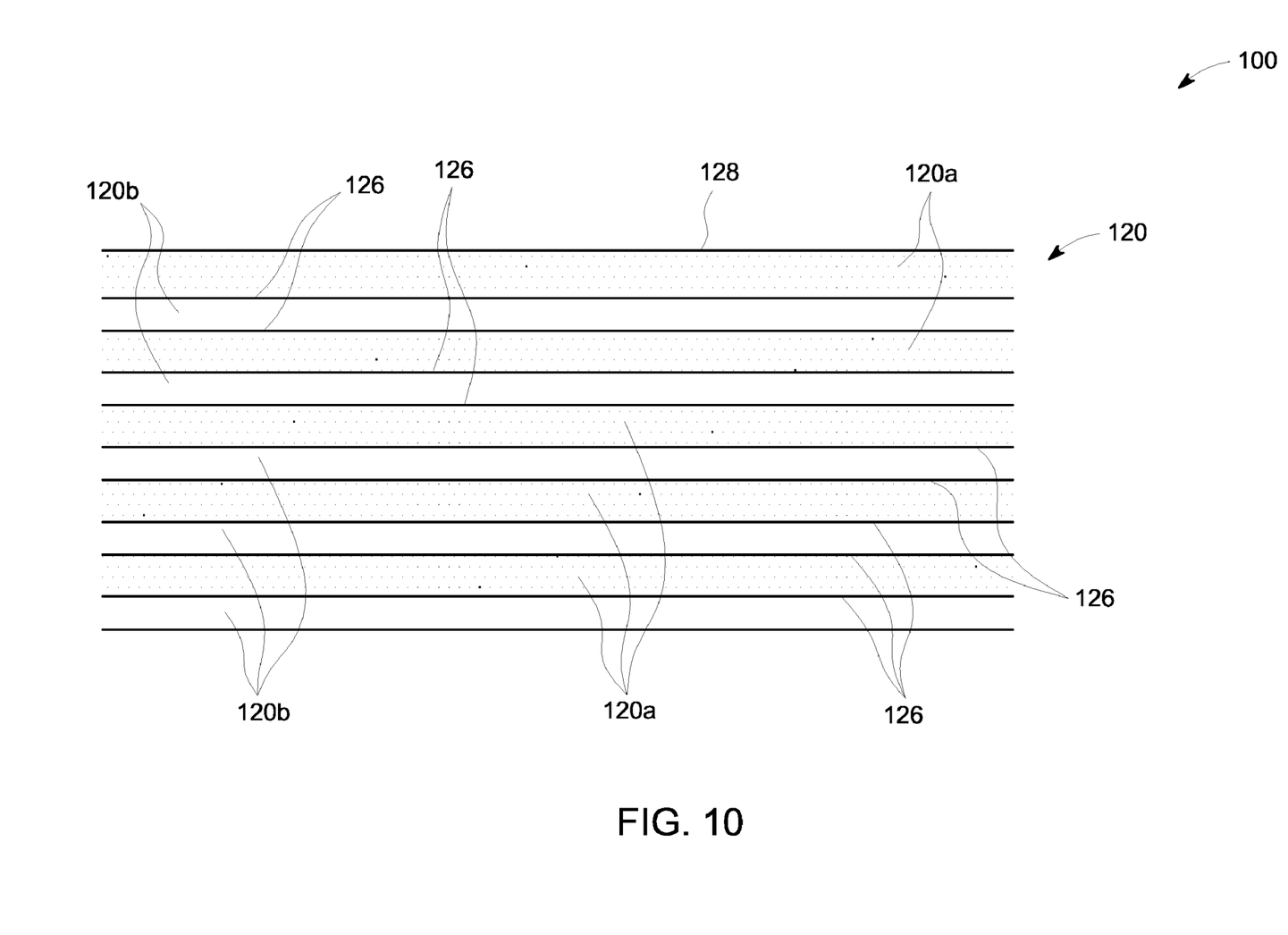
FIG. 10 is a cross-sectional schematic view of a neutron sensing element of a radiation detector in which the neutron sensing element of FIG. 9 is composed of stack layers according to an alternate embodiment of the invention.

FIG. 10 illustrates a neutron sensing element 120 with a planar stack of alternating layers of optical waveguide material 120a and NSC material 120b and functionalized reflective layers 126 at the interface between the alternating layers of NSC material 120b and optical waveguide material 120a. The planar stack of alternating layers can terminate with either the optical waveguide material 120a (shown at the top of the stack), or the NSC material 120b (shown at the bottom of the stack). Similar to the neutron sensing element 120 of FIG. 9, the neutron sensing element 120 of FIG. 10 includes the outer reflective layer 128.

Figure 11A:
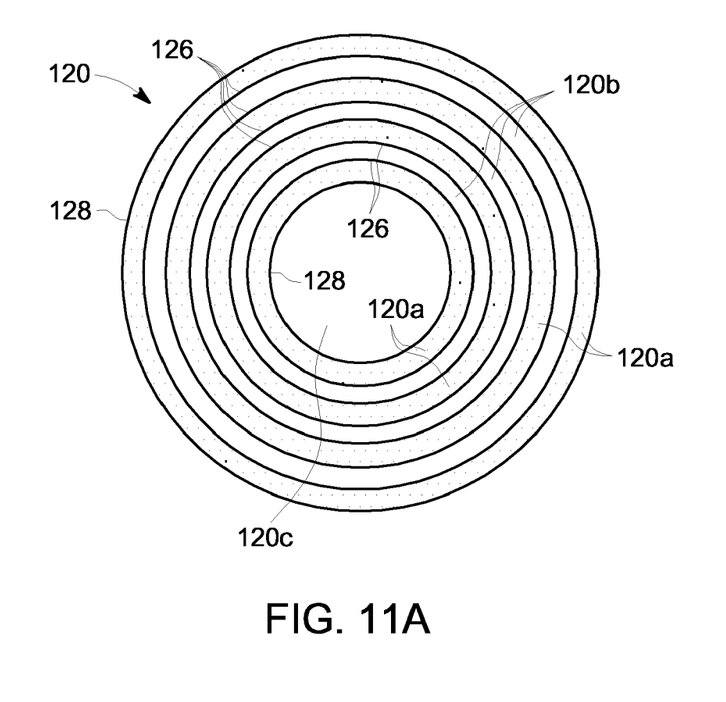
FIGS. 11a and 11b are cross sectional views of the neutron sensing element of the radiation detector of FIG. 10 in which the stacked layers have been "rolled" into different configurations.
Figure 11B:
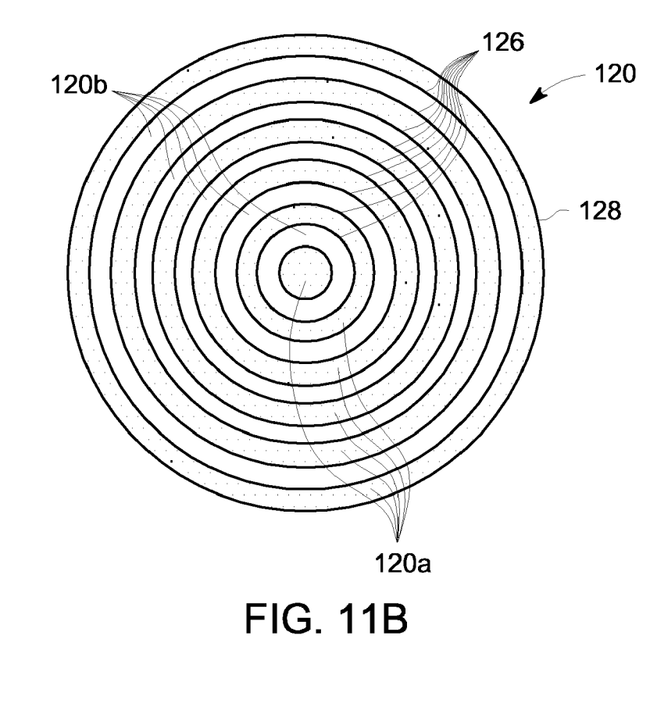

The neutron sensing element 120 of FIG. 10 can be "rolled" around a common axis to generate nested, concentric cylinders to include the cavity 120c, as shown in FIG. 11a, or without the cavity 120c, as shown in FIG. 11b. Similar to the neutron sensing element 120 of FIG. 10, the neutron sensing element 120 of FIG. 11 includes the functionalized reflective layers 126 at the interface between each of the alternating layers of NSC material 120b and optical waveguide material 120a. In addition, the neutron sensing element 120 of FIG. 11 includes the outer reflective layer 128.

Figure 12A:
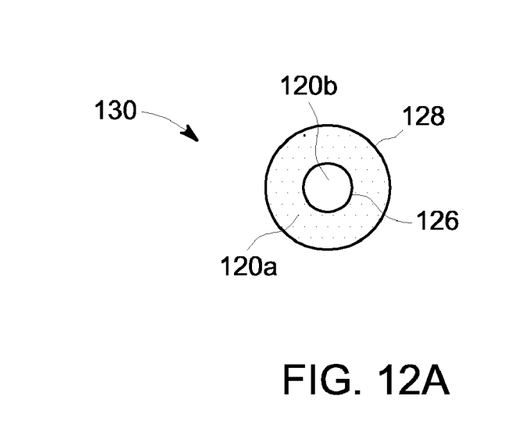
FIGS. 12a and 12b are cross sectional views of a straw filament composed of a solid core of NSC material and composed of the NSC material disposed between optical waveguide material, respectively.
Figure 12B:
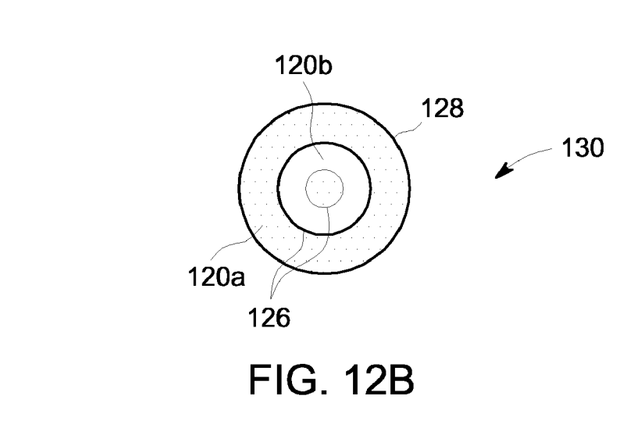

A subset of the cylindrical geometry of the neutron sensing element 120 shown in FIGS. 10 and 11 is the strand 130, shown in FIGS. 12a and 12b. Strands 130 exhibit one of two simple cross-sections: [1] a core of NSC material 120b with an cladding of optical waveguide material 120a as shown in FIG. 12a, or [2] a layer of NSC material 120b sandwiched between a core and cladding of optical waveguide material 120a as shown in FIG. 12b. Similar to the neutron sensing element 120 of FIG. 10, the strand 130 includes the functionalized reflective layers 126 at the interface between each of the alternating layers of NSC material 120b and optical waveguide material 120a. In addition, the neutron sensing element 120 of FIG. 11 includes the outer reflective layer 128.

Figure 13A:
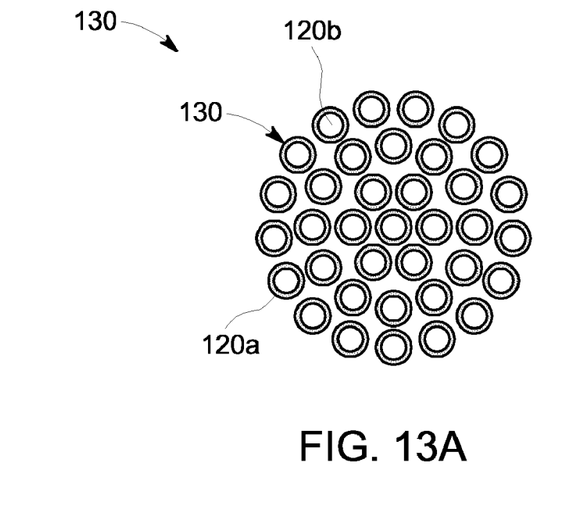
FIGS. 13a and 13b are cross sectional views of neutron sensing elements in which the straw filaments have a solid cylindrical configuration and an annular cylindrical configuration, respectively.
Figure 13B:
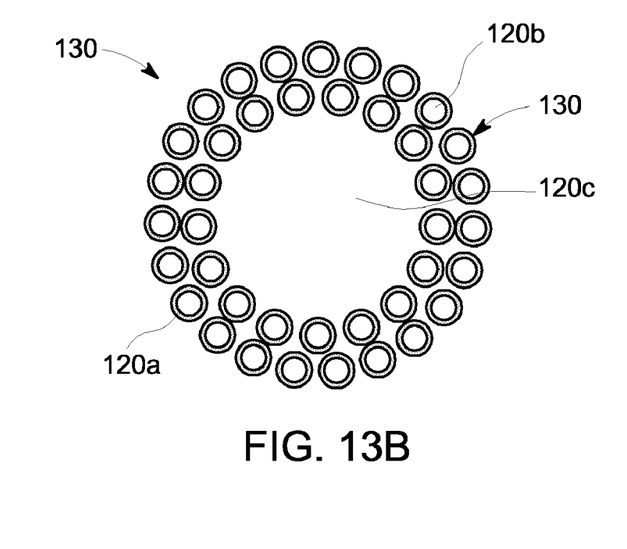

The strands 130 shown in FIG. 12a and FIG. 12b can be combined to produce larger volumes. One way to produce a larger volume is to trace the axes of the strands 130 in a circular arc to create the neutron sensing element 120 in the form of a cylindrical shell having a varying diameter, as shown in FIGS. 13a and 13b. The cylindrical shell can be nested concentrically to form a solid bundle, as shown in FIG. 13a, or a bundle with the cavity 120c can be formed by omitting the appropriate strands 130, as shown in FIG. 13b. Varying the number of strands 130 can vary the diameter of the cylindrical shell of the neutron sensing element 120.

Figure 14A:
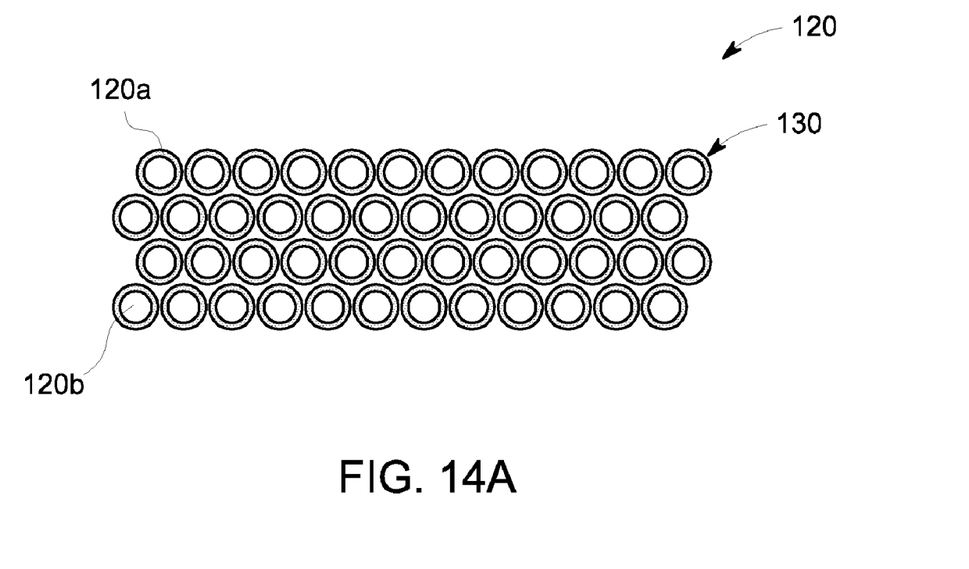
FIGS. 14a and 14b are cross sectional views of neutron sensing elements in which the straw filaments having a solid planar configuration and a planar configuration with one or more apertures, respectively.
Figure 14B:
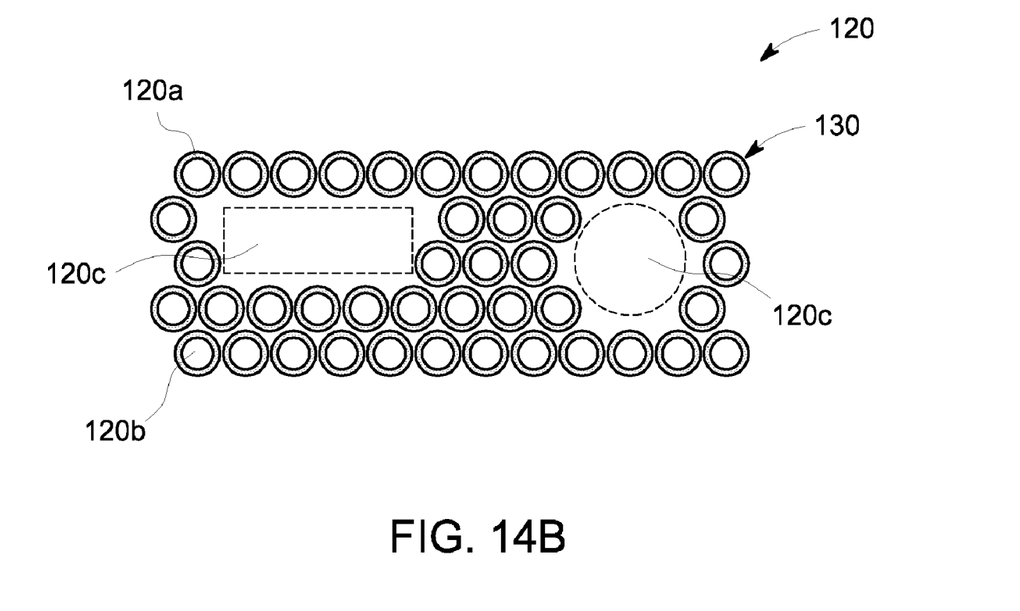

Another way to produce a larger volume is to trace the axes of the strands 130 in a straight line to create a planar shell, as shown in FIGS. 14a and 14b. If necessary, one or more cavities 120c can be created in the neutron sensing element 120 by omitting the appropriate strands 130.

It is noted that only the strand 130 shown in FIG. 12a with the solid core of NSC material 120b with an outer layer of optical waveguide material 120a is shown in FIGS. 13a, 13b, 14a and 14b. However, it will be appreciated that the strand 130 shown in FIG. 12b, or strands with other cylindrically-symmetric cross-sections, can also be used to form the cylindrical or planar shells, or used in combination with the strand 130 shown in FIG. 12a to form the neutron sensing element 120 in FIGS. 13a, 13b, 14a and 14b.

It will be appreciated that volumes comprised of the strands 130 represent the most efficient configuration for neutron detection. Specifically, long optical paths in conventional detectors are restricted to one principal dimension, whereas the concentric cylinders geometry (FIGS. 13a, 13b) or simple planar stack geometry (FIGS. 14a, 14b) offers two principal dimensions. Limiting the availability of long optical paths is important to minimize self-absorption in the NSC material 120b.

Figure 15A:
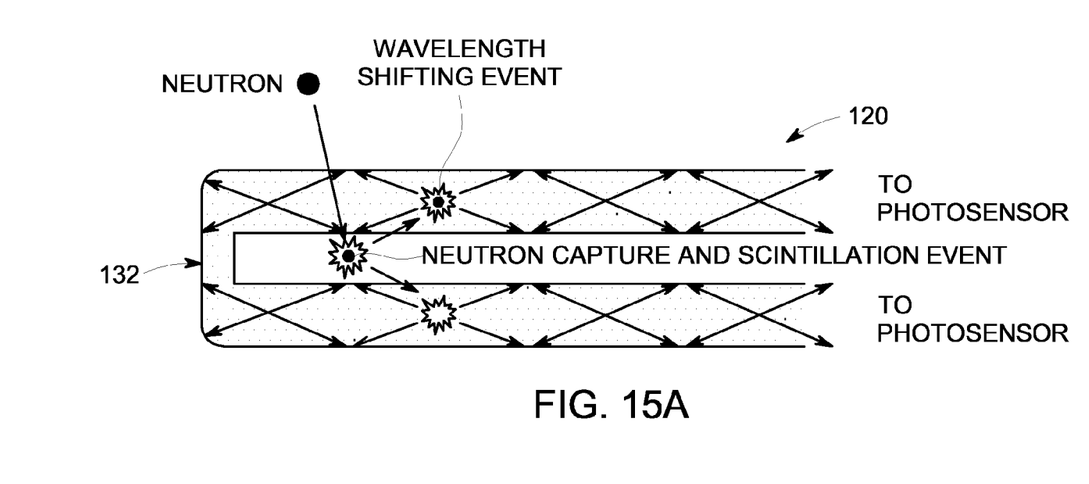
FIGS. 15a and 15b are cross sectional schematic views of the neutron sensing elements of FIGS. 9 and 10 with a layer of mirrored reflective material at one free end of the optical waveguide material, respectively.
Figure 15B:
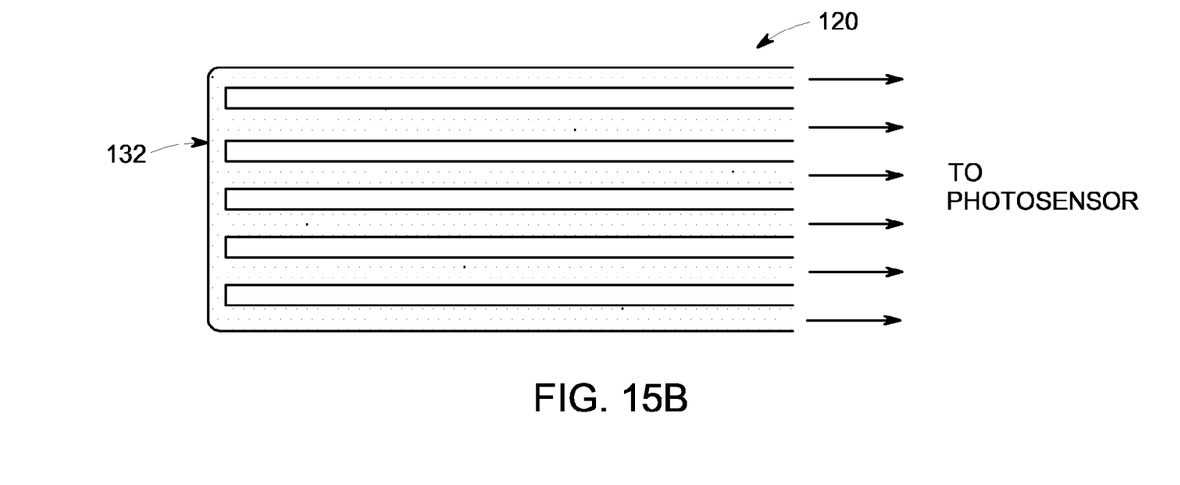

In the radiation detectors 10, 100, the ends of the optical waveguide material 120a of the neutron sensing element 120 are optically coupled to the photosensing element 24, either indirectly (i.e., optical fibers, concentrators, prisms, etc.) or directly (i.e., physical contact, optically-transparent epoxy or grease, etc.). Such coupling is known to those skilled in the art. However, certain applications may require a "free" or uncoupled end if only one end of the optical waveguide material 120a is coupled to the photosensing element 24. To minimize the leakage of light (photons) at the "free end(s)", the appropriate surfaces are coated with a layer of mirrored waveguide material. As shown in FIGS. 15a and 15b, the layer of mirrored waveguide material 132 is shown at one of the "free end" of the neutron sensing element 120 of the radiation detector 100 of FIGS. 9 and 10, respectively. For the radiation detector 100 with the neutron sensing element 120 composed of straw filaments 130 as shown in FIGS. 13a, 13b, 14a and 14b, it may be preferred to terminate the free end of each individual straw filament 130 before bundling the straw filaments 130 to form the neutron sensing element 120.

As described above, the radiation detector 100 of the invention, when incorporating $^6$LiF/ZnS:Ag granular components and 9,10-Bis(Phenylethynyl)Anthracene as wavelength-shifting dopant, functions according to the following process:

[1] $^6$Li isotope atoms in $^6$LiF absorb incoming thermal neutrons and disintegrate into energetic alpha and triton particles;

[2] The alpha and triton particles excite ZnS:Ag, which upon relaxation, emits ~450-nm photons (i.e., the scintillator emission);

[3] The ~450-nm photons pass through the functionalized reflective layer and enter the optical waveguide material;

[4] The ~450-nm photons are absorbed by the 9,10-Bis (Phenylethynyl) Anthracene dopant dispersed in the optical waveguide material (i.e., optical waveguide) and become re-emitted as ~500-nm photons;

[5] The ~500 nm photons are reflected by the functionalized reflective layer(s) in such a way that the optical waveguide material that collects and channels the photons toward the ends of the optical waveguide material; and

[6] The ~500 nm photons exit the optical waveguide material and enter a photosensing element (i.e., photosensor) that counts each photon.

While the ZnS:Ag emission occurs around 450 nm, other activators (e.g., Cu) could be used to shift the emission wavelength with minimal impact on the scintillation efficiency. In similar fashion, substitutes for zinc (e.g., Cd to produce $Zn_{1-x}Cd_xS$), sulfur (e.g., Se to produce $ZnS_{1-x}Se_x$), or both could also be utilized to shift the emission wavelength. The emission wavelength of the scintillator and the excitation wavelength of the dopant could therefore be matched to maximize the overall light intensity in the optical waveguide.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:
1. A radiation detector, comprising:
    a neutron sensing element comprising a neutron scintillating composite material that emits a first photon having a first wavelength in response to a neutron capture event, and an optical waveguide material at least partially surrounding the neutron scintillating composite material, the optical waveguide material having a wavelength-shifting dopant dispersed therein that absorbs the first photon emitted by the neutron scintillating composite material and emits a second photon having a second wavelength, the second wavelength different than the first wavelength, and a functionalized reflective layer at an interface between the neutron scintillating composite material and the optical waveguide material, wherein the functionalized reflective layer allows the first photon emitted by the neutron scintillating composite material to pass through the functionalized reflective layer and into the optical waveguide material, and prevents the second photon emitted by the optical waveguide material from passing through the functionalized reflective layer and into the neutron scintillating composite material, and wherein photons emitted from the neutron sensing element are collected and channeled through the optical waveguide material and into a photosensing element optically coupled to the neutron sensing element.

2. The detector according to claim 1, wherein the neutron sensing element comprises a plurality of cylindrical, concentric shells.

3. The detector according to claim 2, wherein the neutron scintillating material and the optical waveguide material alternate between each shell of the plurality of cylindrical, concentric shells.

4. The detector according to claim 2, wherein at least one shell of the plurality of cylindrical shells is substantially aligned along a longitudinal axis of the detector.

5. The detector according to claim 1, wherein the neutron sensing element comprises a plurality of strands.

6. The detector according to claim 5, wherein each strand comprises a solid core of the neutron scintillating material disposed within the optical waveguide material.

7. The detector according to claim 5, wherein each strand comprises a plurality of cylindrical, concentric shells.

8. The detector according to claim 7, wherein the neutron scintillating material and the optical waveguide material alternate between each shell of the plurality of cylindrical, concentric shells.

9. The detector according to claim 5, wherein at least one strand of the plurality of strands is substantially aligned along a longitudinal axis of the detector.

10. The detector according to claim 1, wherein the optical waveguide material comprises an optical waveguide.

11. A method of detecting radiation comprising:

disposing a neutron scintillating composite material within an optical waveguide material to form a neutron sensing element, the neutron scintillating composite material emitting a first photon having a first wavelength in response to a neutron capture event;

dispersing a wavelength-shifting dopant within the optical waveguide material, the wavelength-shifting dopant absorbing the first photon emitted by the neutron scintillating composite material and emitting a second photon having a second wavelength, the second wavelength different than the first wavelength; and disposing a functionalize reflective layer between the neutron scintillating composite material and the optical waveguide material, whereby the functionalized reflective layer allows the first photon emitted by the neutron scintillating composite material to pass through the functionalized reflective layer and into the optical waveguide material, and prevents the second photon emitted by the optical waveguide material from passing through the functionalized reflective layer and into the neutron scintillating composite material, and whereby photons emitted from the neutron sensing element are collected and channeled through the optical waveguide material and into a photosensing element optically coupled to the neutron sensing element.

* * * * *